United States Patent
Beers

(10) Patent No.: US 9,841,012 B2
(45) Date of Patent: Dec. 12, 2017

(54) LINEAR COMPRESSOR

(71) Applicant: General Electric Company, Schenectady, NY (US)

(72) Inventor: David G. Beers, Elizabeth, IN (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 374 days.

(21) Appl. No.: 14/177,034

(22) Filed: Feb. 10, 2014

(65) Prior Publication Data

US 2015/0226201 A1 Aug. 13, 2015

(51) Int. Cl.
| | | |
|---|---|---|
| *F04B 53/14* | (2006.01) | |
| *F04B 39/00* | (2006.01) | |
| *F04B 35/04* | (2006.01) | |
| *F16J 1/14* | (2006.01) | |

(52) U.S. Cl.
CPC ........ *F04B 39/0005* (2013.01); *F04B 35/045* (2013.01); *F04B 53/144* (2013.01); *F16J 1/14* (2013.01)

(58) Field of Classification Search
CPC .. F04B 39/0022; F04B 53/144; F04B 53/145; F04B 53/146; F04B 53/147; F04B 39/0005; F04B 35/045; F04B 35/04; F16J 1/14; F16J 1/20; F16J 1/22; F15B 15/148
USPC .......................... 267/180, 161, 162; 417/417
See application file for complete search history.

(56) References Cited

U.S. PATENT DOCUMENTS

| | | | | |
|---|---|---|---|---|
| 1,191,174 | A | * 7/1916 | Gilligan | F02B 75/044 |
| | | | | 123/65 R |
| 1,857,750 | A | * 5/1932 | Wilbur | F01L 29/04 |
| | | | | 267/124 |
| 2,219,566 | A | * 10/1940 | Sauzedde | B60T 11/224 |
| | | | | 123/198 R |
| 2,395,018 | A | * 2/1946 | Sherman | B23Q 5/263 |
| | | | | 173/161 |
| 2,605,615 | A | * 8/1952 | Meredith | F15B 9/12 |
| | | | | 244/226 |
| 2,792,686 | A | * 5/1957 | Ingres | B60T 13/244 |
| | | | | 188/152 |
| 2,847,829 | A | * 8/1958 | Gladden | B60T 13/165 |
| | | | | 188/152 |
| 3,048,980 | A | * 8/1962 | Cousino | B60T 7/04 |
| | | | | 60/590 |
| 4,699,355 | A | * 10/1987 | Tomlin | E21B 33/0355 |
| | | | | 251/62 |
| 5,146,124 | A | 9/1992 | Higham et al. | |

(Continued)

FOREIGN PATENT DOCUMENTS

| | | |
|---|---|---|
| EP | 0620367 | 4/1993 |
| WO | WO 2005/028841 | 3/2005 |

(Continued)

*Primary Examiner* — Theodore Stigell
*Assistant Examiner* — Chirag Jariwala
(74) *Attorney, Agent, or Firm* — Dority & Manning, P.A.

(57) ABSTRACT

A linear compressor is provided. The linear compressor includes a piston slidably received within a chamber of a cylinder assembly and a mover positioned in a driving coil. The linear compressor also includes features for coupling the piston to the mover such that motion of the mover is transferred to the piston during operation of the driving coil and for reducing friction between the piston and the cylinder during motion of the piston within the chamber of the cylinder.

14 Claims, 11 Drawing Sheets

(56) References Cited

U.S. PATENT DOCUMENTS

| | | | | |
|---|---|---|---|---|
| 5,257,915 A * | 11/1993 | Laskaris | F04B 35/045 | 417/415 |
| 5,261,799 A * | 11/1993 | Laskaris | H02K 33/18 | 310/15 |
| 5,318,412 A * | 6/1994 | Laskaris | F04B 35/045 | 417/417 |
| 5,525,845 A | 6/1996 | Beale et al. | | |
| 5,890,415 A * | 4/1999 | Asou | F04B 53/143 | 417/470 |
| 5,944,302 A | 8/1999 | Loc et al. | | |
| 6,364,280 B1 * | 4/2002 | Stach | F15B 13/0402 | 137/625.69 |
| 6,812,597 B2 | 11/2004 | McGill et al. | | |
| 6,946,754 B2 | 9/2005 | Inagaki et al. | | |
| 7,441,980 B2 * | 10/2008 | Leitermann | F16B 5/025 | 267/157 |
| 7,614,856 B2 | 11/2009 | Inagaki et al. | | |
| 7,618,243 B2 | 11/2009 | Tian et al. | | |
| 8,011,183 B2 | 9/2011 | Berchowitz | | |
| 8,127,560 B2 | 3/2012 | Dicken | | |
| 8,177,523 B2 | 5/2012 | Patel et al. | | |
| 8,241,015 B2 * | 8/2012 | Lillie | F04B 35/045 | 417/363 |
| 8,495,987 B2 * | 7/2013 | Lucas | F04B 53/144 | 123/495 |
| 8,998,589 B2 * | 4/2015 | Lilie | F04B 35/045 | 417/410.1 |
| 2003/0183073 A1 * | 10/2003 | Lilie | F04B 35/045 | 91/394 |
| 2006/0171822 A1 | 8/2006 | Seagar et al. | | |
| 2006/0250032 A1 * | 11/2006 | Her | F04B 35/045 | 310/13 |
| 2006/0251529 A1 * | 11/2006 | Kim | F04B 35/045 | 417/417 |
| 2006/0261681 A1 * | 11/2006 | Choi | F04B 35/045 | 310/15 |
| 2007/0009370 A1 * | 1/2007 | Kim | F04B 35/045 | 417/417 |
| 2007/0108850 A1 * | 5/2007 | Chertok | H02K 1/145 | 310/15 |
| 2007/0110600 A1 * | 5/2007 | Park | F04B 35/045 | 417/417 |
| 2007/0132321 A1 * | 6/2007 | Park | F04B 35/045 | 310/15 |
| 2007/0134108 A1 * | 6/2007 | Her | F04B 35/045 | 417/417 |
| 2007/0152516 A1 * | 7/2007 | Lee | H02K 33/16 | 310/15 |
| 2007/0152517 A1 * | 7/2007 | Park | H02K 33/16 | 310/15 |
| 2008/0022850 A1 * | 1/2008 | Kim | F04B 39/0005 | 92/84 |
| 2008/0089796 A1 * | 4/2008 | Schade | F04B 35/045 | 417/417 |
| 2008/0134833 A1 * | 6/2008 | Lilie | F04B 35/045 | 74/581 |
| 2008/0213108 A1 * | 9/2008 | Choi | F04B 35/045 | 417/417 |
| 2009/0039655 A1 | 2/2009 | Berchowitz | | |
| 2009/0094977 A1 | 4/2009 | Hill | | |
| 2009/0129955 A1 * | 5/2009 | Schubert | F04B 35/045 | 417/417 |
| 2009/0208347 A1 * | 8/2009 | Heo | F04B 35/045 | 417/44.1 |
| 2009/0263262 A1 | 10/2009 | McGill | | |
| 2009/0280015 A1 * | 11/2009 | Lillie | F04B 35/045 | 417/416 |
| 2009/0304525 A1 * | 12/2009 | Reinschke | F04B 35/045 | 417/53 |
| 2010/0008794 A1 * | 1/2010 | Rush | A61M 5/14216 | 417/53 |
| 2010/0147758 A1 * | 6/2010 | Hans-Georg | F04B 49/065 | 210/198.2 |
| 2010/0260627 A1 * | 10/2010 | Kang | F04B 35/045 | 417/417 |
| 2010/0260628 A1 * | 10/2010 | Kim | F04B 39/121 | 417/417 |
| 2010/0260629 A1 * | 10/2010 | Kang | F04B 39/0061 | 417/417 |
| 2010/0266429 A1 * | 10/2010 | Kang | F04B 39/0088 | 417/417 |
| 2010/0290936 A1 * | 11/2010 | Kang | F04B 39/0061 | 417/417 |
| 2010/0296951 A1 * | 11/2010 | Lee | F04B 35/045 | 417/417 |
| 2010/0310393 A1 * | 12/2010 | Lee | H02K 33/16 | 417/417 |
| 2010/0316513 A1 * | 12/2010 | Lee | F04B 39/14 | 417/417 |
| 2011/0042413 A1 * | 2/2011 | Nighy | B67D 1/0078 | 222/129.1 |
| 2011/0056196 A1 | 3/2011 | Berchowitz et al. | | |
| 2011/0058960 A1 | 3/2011 | Bernhard Lilie et al. | | |
| 2011/0061411 A1 * | 3/2011 | Kim | F04B 35/045 | 62/132 |
| 2011/0097224 A1 * | 4/2011 | Kang | F04B 35/045 | 417/417 |
| 2011/0135518 A1 * | 6/2011 | Kang | F04B 35/045 | 417/417 |
| 2011/0194957 A1 * | 8/2011 | Kang | F04B 35/045 | 417/415 |
| 2011/0318193 A1 * | 12/2011 | Hu | F04B 35/045 | 417/44.1 |
| 2012/0034114 A1 * | 2/2012 | Lee | F04B 35/045 | 417/417 |
| 2012/0177513 A1 * | 7/2012 | Lilie | F04B 35/045 | 417/417 |
| 2014/0072461 A1 * | 3/2014 | Barito | F04B 35/045 | 417/415 |
| 2014/0072462 A1 * | 3/2014 | Filippa | F04B 35/045 | 417/415 |
| 2014/0234145 A1 * | 8/2014 | Roman | F04B 35/045 | 417/481 |
| 2014/0241911 A1 * | 8/2014 | Roman | F04B 35/045 | 417/328 |
| 2014/0301874 A1 * | 10/2014 | Roettger | F04B 35/045 | 417/437 |
| 2015/0040752 A1 * | 2/2015 | Roman | F04B 39/0022 | 92/172 |
| 2015/0226194 A1 * | 8/2015 | Barito | F04B 39/0005 | 417/417 |
| 2015/0226200 A1 * | 8/2015 | Beers | F04B 39/0005 | 417/416 |
| 2015/0226201 A1 * | 8/2015 | Beers | F04B 35/045 | 417/363 |
| 2015/0226202 A1 * | 8/2015 | Beers | F04B 39/0005 | 417/363 |
| 2015/0226210 A1 * | 8/2015 | Barito | F04B 35/045 | 417/415 |

FOREIGN PATENT DOCUMENTS

| | | |
|---|---|---|
| WO | WO 2006/013377 | 2/2006 |
| WO | WO 2006/081642 | 2/2006 |
| WO | WO 2013/003923 | 1/2013 |

* cited by examiner

LINEAR COMPRESSOR

FIELD OF THE INVENTION

The present subject matter relates generally to linear compressors, e.g., for refrigerator appliances.

BACKGROUND OF THE INVENTION

Certain refrigerator appliances include sealed systems for cooling chilled chambers of the refrigerator appliance. The sealed systems generally include a compressor that generates compressed refrigerant during operation of the sealed system. The compressed refrigerant flows to an evaporator where heat exchange between the chilled chambers and the refrigerant cools the chilled chambers and food items located therein.

Recently, certain refrigerator appliances have included linear compressors for compressing refrigerant. Linear compressors generally include a piston and a driving coil. The driving coil receives a current that generates a force for sliding the piston forward and backward within a chamber. During motion of the piston within the chamber, the piston compresses refrigerant. However, friction between the piston and a wall of the chamber can negatively affect operation of the linear compressors if the piston is not suitably aligned within the chamber. In particular, friction losses due to rubbing of the piston against the wall of the chamber can negatively affect an efficiency of an associated refrigerator appliance.

The driving coil generally engages a magnet on a mover assembly of the linear compressor in order to reciprocate the piston within the chamber. The magnet is spaced apart from the driving coil by an air gap. In certain linear compressors, an additional air gap is provided at an opposite side of the magnet, e.g., between the magnet and an inner back iron of the linear compressor. However, multiple air gaps can negatively affect operation of the linear compressor by interrupting transmission of a magnetic field from the driving coil. In addition, maintaining a uniform air gap between the magnet and the driving coil and/or inner back iron can be difficult.

Accordingly, a linear compressor with features for limiting friction between a piston and a wall of a cylinder during operation of the linear compressor would be useful. In addition, a linear compressor with features for maintaining uniformity of an air gap between a magnet and a driving coil of the linear compressor would be useful. In particular, a linear compressor having only a single air gap would be useful.

BRIEF DESCRIPTION OF THE INVENTION

The present subject matter provides a linear compressor. The linear compressor includes a piston slidably received within a chamber of a cylinder assembly and a mover positioned in a driving coil. The linear compressor also includes features for coupling the piston to the mover such that motion of the mover is transferred to the piston during operation of the driving coil and for reducing friction between the piston and the cylinder during motion of the piston within the chamber of the cylinder. Additional aspects and advantages of the invention will be set forth in part in the following description, or may be apparent from the description, or may be learned through practice of the invention.

In a first exemplary embodiment, a linear compressor is provided. The linear compressor defines a radial direction, a circumferential direction and an axial direction. The linear compressor includes a cylinder assembly that defines a chamber. A piston is received within the chamber of the cylinder assembly such that the piston is slidable along a first axis within the chamber of the cylinder assembly. The linear compressor also includes an inner back iron assembly. A driving coil extends about the inner iron assembly along the circumferential direction. The driving coil is operable to move the inner back iron assembly along a second axis. The first and second axes are substantially parallel to the axial direction. A magnet is mounted to the inner back iron assembly such that the magnet is spaced apart from the driving coil by an air gap along the radial direction. A flexible coupling includes a flat wire coil spring that extends between the inner back iron assembly and the piston along the axial direction and a wire disposed within the flat wire coil spring and extending between the inner back iron assembly and the piston along the axial direction.

In a second exemplary embodiment, a linear compressor is provided. The linear compressor includes a cylinder assembly that defines a chamber. A piston is slidably received within the chamber of the cylinder assembly. The linear compressor also includes a driving coil. A mover is positioned in the driving coil. A magnet is mounted to mover. A magnetic field of the driving coil engages the magnet in order to move the mover in the driving coil during operation of the driving coil. A flexible coupling includes a flat wire coil spring that extends between the mover and the piston and a wire that is disposed within the flat wire coil spring and extends between the mover and the piston.

In a third exemplary embodiment, a linear compressor is provided. The linear compressor includes a cylinder assembly that defines a chamber. A piston is slidably received within the chamber of the cylinder assembly. The linear assembly also includes a driving coil and a mover positioned in the driving coil. The linear compressor further includes means for coupling the piston to the mover such that motion of the mover is transferred to the piston during operation of the driving coil and for reducing friction between the piston and the cylinder during motion of the piston within the chamber of the cylinder.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
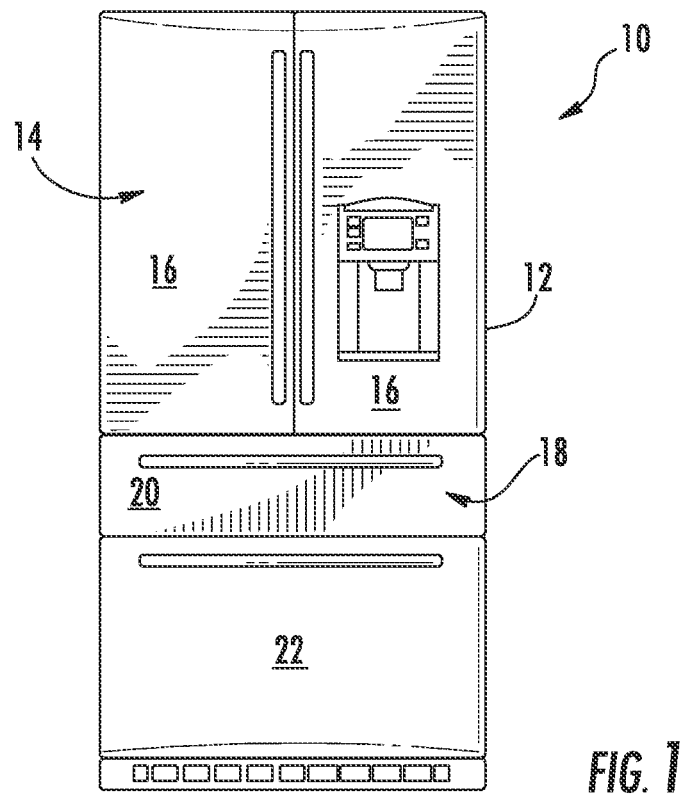
FIG. 1 is a front elevation view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
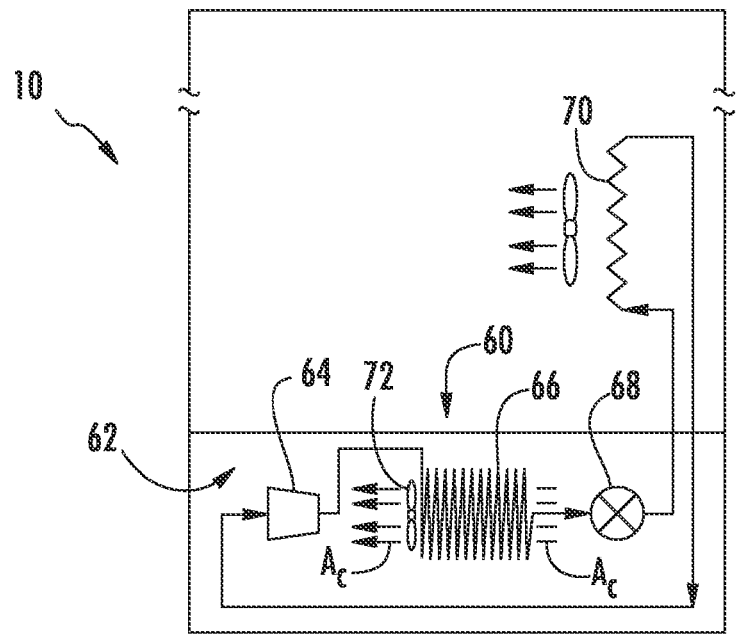
FIG. 2 is schematic view of certain components of the exemplary refrigerator appliance of FIG. 1.

FIG. 1 depicts a refrigerator appliance 10 that incorporates a sealed refrigeration system 60 (FIG. 2). It should be appreciated that the term "refrigerator appliance" is used in a generic sense herein to encompass any manner of refrigeration appliance, such as a freezer, refrigerator/freezer combination, and any style or model of conventional refrigerator. In addition, it should be understood that the present subject matter is not limited to use in appliances. Thus, the present subject matter may be used for any other suitable purpose, such as vapor compression within air conditioning units or air compression within air compressors.

In the illustrated exemplary embodiment shown in FIG. 1, the refrigerator appliance 10 is depicted as an upright refrigerator having a cabinet or casing 12 that defines a number of internal chilled storage compartments. In particular, refrigerator appliance 10 includes upper fresh-food compartments 14 having doors 16 and lower freezer compartment 18 having upper drawer 20 and lower drawer 22. The drawers 20 and 22 are "pull-out" drawers in that they can be manually moved into and out of the freezer compartment 18 on suitable slide mechanisms.

FIG. 2 is a schematic view of certain components of refrigerator appliance 10, including a sealed refrigeration system 60 of refrigerator appliance 10. A machinery compartment 62 contains components for executing a known vapor compression cycle for cooling air. The components include a compressor 64, a condenser 66, an expansion device 68, and an evaporator 70 connected in series and charged with a refrigerant. As will be understood by those skilled in the art, refrigeration system 60 may include additional components, e.g., at least one additional evaporator, compressor, expansion device, and/or condenser. As an example, refrigeration system 60 may include two evaporators.

Within refrigeration system 60, refrigerant flows into compressor 64, which operates to increase the pressure of the refrigerant. This compression of the refrigerant raises its temperature, which is lowered by passing the refrigerant through condenser 66. Within condenser 66, heat exchange with ambient air takes place so as to cool the refrigerant. A fan 72 is used to pull air across condenser 66, as illustrated by arrows $A_C$, so as to provide forced convection for a more rapid and efficient heat exchange between the refrigerant within condenser 66 and the ambient air. Thus, as will be understood by those skilled in the art, increasing air flow across condenser 66 can, e.g., increase the efficiency of condenser 66 by improving cooling of the refrigerant contained therein.

An expansion device (e.g., a valve, capillary tube, or other restriction device) 68 receives refrigerant from condenser 66. From expansion device 68, the refrigerant enters evaporator 70. Upon exiting expansion device 68 and entering evaporator 70, the refrigerant drops in pressure. Due to the pressure drop and/or phase change of the refrigerant, evaporator 70 is cool relative to compartments 14 and 18 of refrigerator appliance 10. As such, cooled air is produced and refrigerates compartments 14 and 18 of refrigerator appliance 10. Thus, evaporator 70 is a type of heat exchanger which transfers heat from air passing over evaporator 70 to refrigerant flowing through evaporator 70.

Collectively, the vapor compression cycle components in a refrigeration circuit, associated fans, and associated compartments are sometimes referred to as a sealed refrigeration system operable to force cold air through compartments 14, 18 (FIG. 1). The refrigeration system 60 depicted in FIG. 2 is provided by way of example only. Thus, it is within the scope of the present subject matter for other configurations of the refrigeration system to be used as well.

Figure 3:
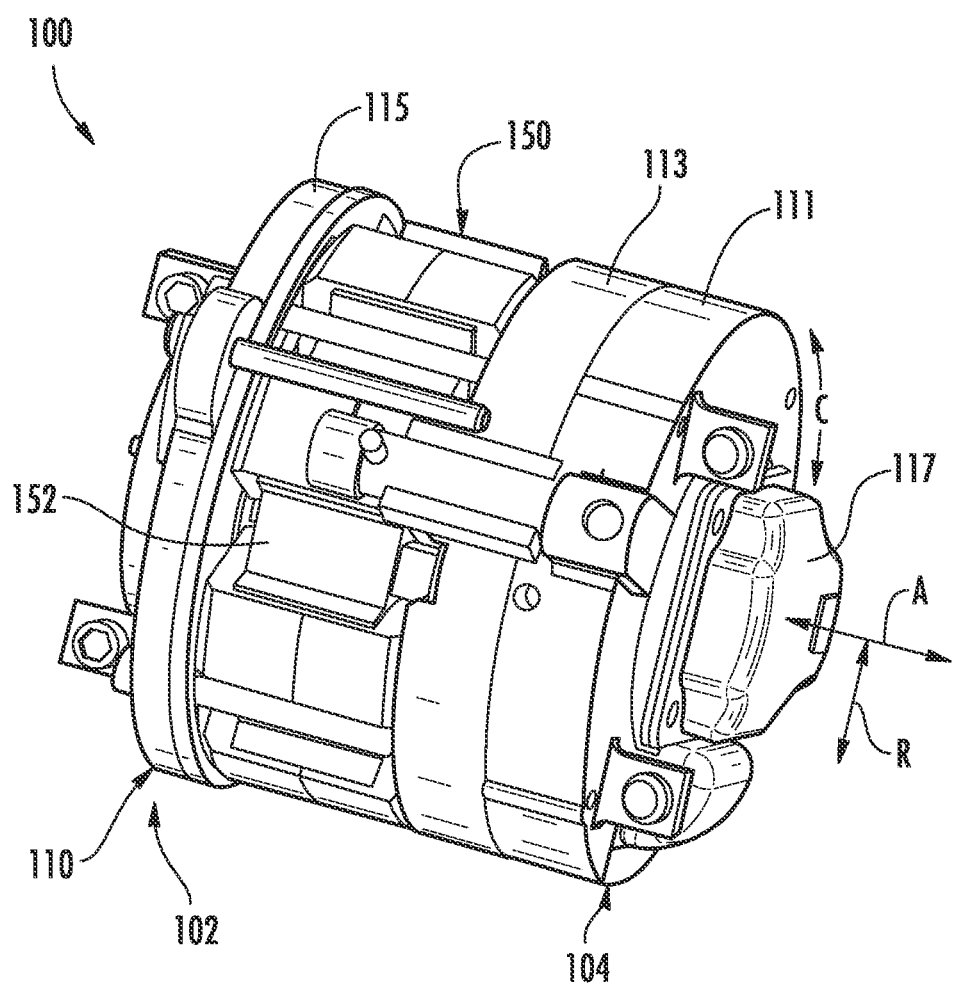
FIG. 3 provides a perspective view of a linear compressor according to an exemplary embodiment of the present subject matter.
Figure 4:
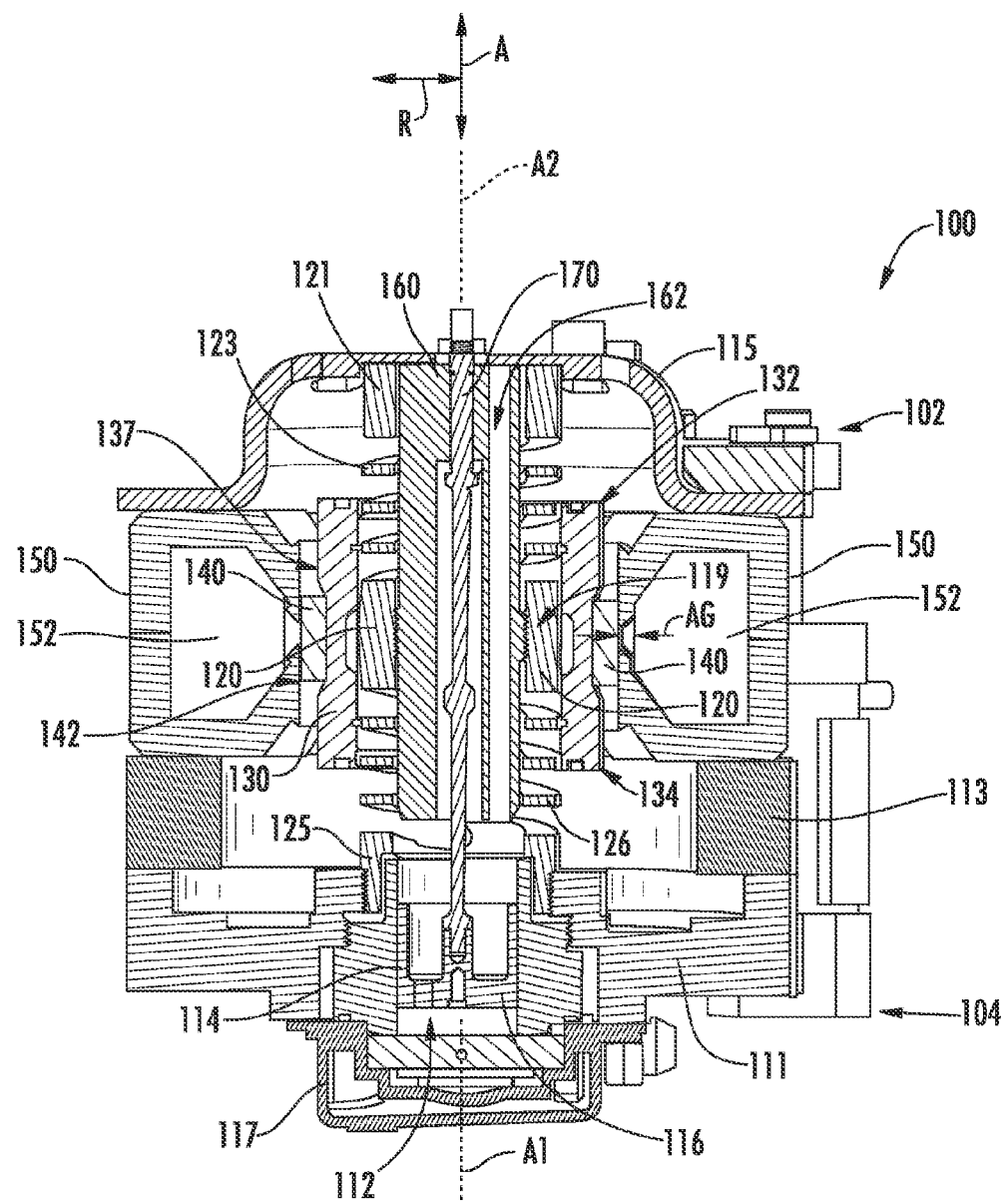
FIG. 4 provides a side section view of the exemplary linear compressor of FIG. 3.
Figure 5:
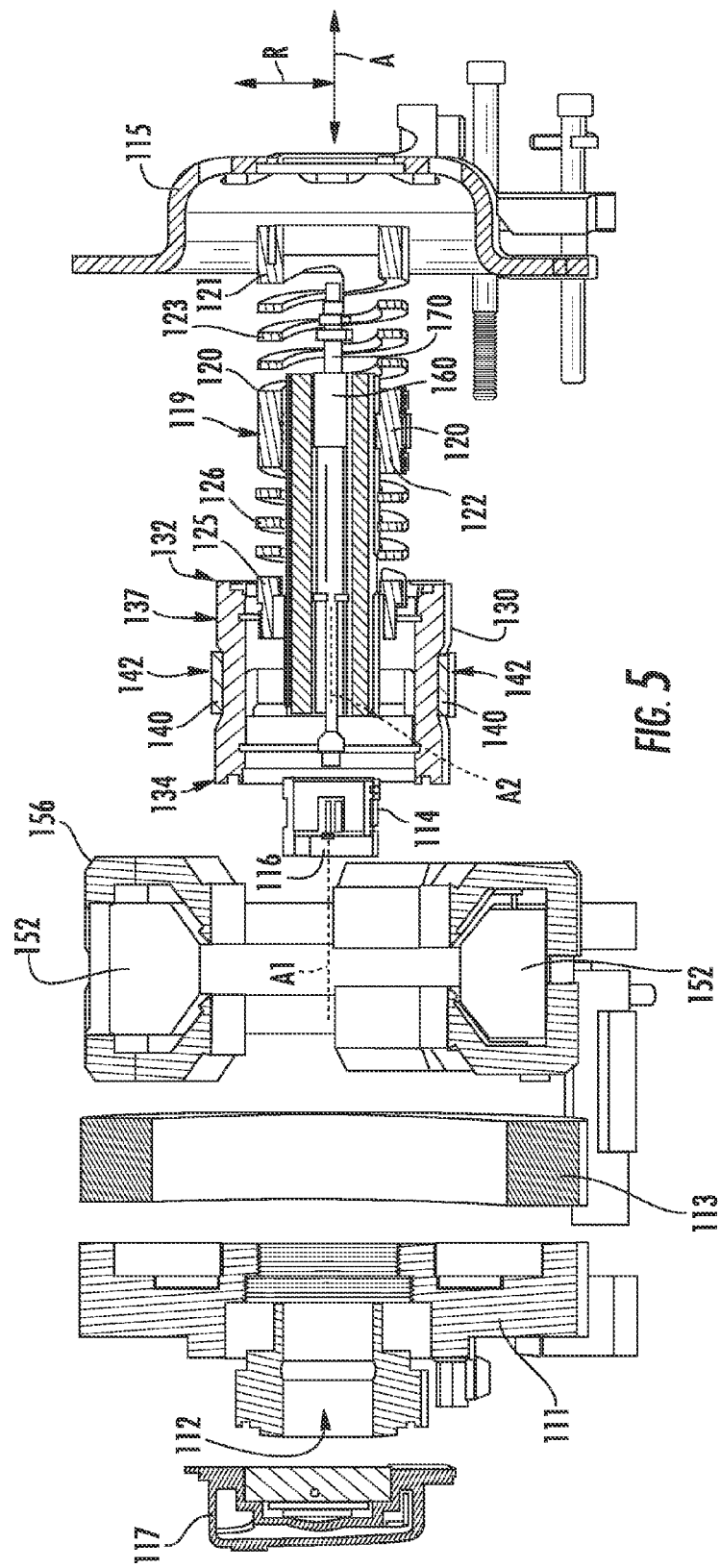
FIG. 5 provides an exploded view of the exemplary linear compressor of FIG. 4.

FIG. 3 provides a perspective view of a linear compressor 100 according to an exemplary embodiment of the present subject matter. FIG. 4 provides a side section view of linear compressor 100. FIG. 5 provides an exploded side section view of linear compressor 100. As discussed in greater detail below, linear compressor 100 is operable to increase a pressure of fluid within a chamber 112 of linear compressor 100. Linear compressor 100 may be used to compress any suitable fluid, such as refrigerant or air. In particular, linear compressor 100 may be used in a refrigerator appliance, such as refrigerator appliance 10 (FIG. 1) in which linear compressor 100 may be used as compressor 64 (FIG. 2). As may be seen in FIG. 3, linear compressor 100 defines an axial direction A, a radial direction R and a circumferential direction C. Linear compressor 100 may be enclosed within a hermetic or air-tight shell (not shown). The hermetic shell can, e.g., hinder or prevent refrigerant from leaking or escaping from refrigeration system 60.

Turning now to FIG. 4, linear compressor 100 includes a casing 110 that extends between a first end portion 102 and a second end portion 104, e.g., along the axial direction A. Casing 110 includes various static or non-moving structural components of linear compressor 100. In particular, casing 110 includes a cylinder assembly 111 that defines a chamber 112. Cylinder assembly 111 is positioned at or adjacent second end portion 104 of casing 110. Chamber 112 extends longitudinally along the axial direction A. Casing 110 also includes a motor mount mid-section 113 and an end cap 115 positioned opposite each other about a motor. A stator, e.g., including an outer back iron 150 and a driving coil 152, of the motor is mounted or secured to casing 110, e.g., such that the stator is sandwiched between motor mount mid-section 113 and end cap 115 of casing 110. Linear compressor 100 also includes valves (such as a discharge valve assembly 117 at an end of chamber 112) that permit refrigerant to enter and exit chamber 112 during operation of linear compressor 100.

A piston assembly 114 with a piston head 116 is slidably received within chamber 112 of cylinder assembly 111. In particular, piston assembly 114 is slidable along a first axis A1 within chamber 112. The first axis A1 may be substantially parallel to the axial direction A. During sliding of piston head 116 within chamber 112, piston head 116 compresses refrigerant within chamber 112. As an example, from a top dead center position, piston head 116 can slide within chamber 112 towards a bottom dead center position along the axial direction A, i.e., an expansion stroke of piston head 116. When piston head 116 reaches the bottom dead center position, piston head 116 changes directions and slides in chamber 112 back towards the top dead center position, i.e., a compression stroke of piston head 116. It should be understood that linear compressor 100 may include an additional piston head and/or additional chamber at an opposite end of linear compressor 100. Thus, linear compressor 100 may have multiple piston heads in alternative exemplary embodiments.

Linear compressor 100 also includes an inner back iron assembly 130. Inner back iron assembly 130 is positioned in the stator of the motor. In particular, outer back iron 150 and/or driving coil 152 may extend about inner back iron assembly 130, e.g., along the circumferential direction C. Inner back iron assembly 130 extends between a first end portion 132 and a second end portion 134, e.g., along the axial direction A.

Inner back iron assembly 130 also has an outer surface 137. At least one driving magnet 140 is mounted to inner back iron assembly 130, e.g., at outer surface 137 of inner back iron assembly 130. Driving magnet 140 may face and/or be exposed to driving coil 152. In particular, driving magnet 140 may be spaced apart from driving coil 152, e.g., along the radial direction R by an air gap AG. Thus, the air gap AG may be defined between opposing surfaces of driving magnet 140 and driving coil 152. Driving magnet 140 may also be mounted or fixed to inner back iron assembly 130 such that an outer surface 142 of driving magnet 140 is substantially flush with outer surface 137 of inner back iron assembly 130. Thus, driving magnet 140 may be inset within inner back iron assembly 130. In such a manner, the magnetic field from driving coil 152 may have to pass through only a single air gap (e.g., air gap AG) between outer back iron 150 and inner back iron assembly 130 during operation of linear compressor 100, and linear compressor 100 may be more efficient than linear compressors with air gaps on both sides of a driving magnet.

As may be seen in FIG. 4, driving coil 152 extends about inner back iron assembly 130, e.g., along the circumferential direction C. Driving coil 152 is operable to move the inner back iron assembly 130 along a second axis A2 during operation of driving coil 152. The second axis may be substantially parallel to the axial direction A and/or the first axis A1. As an example, driving coil 152 may receive a current from a current source (not shown) in order to generate a magnetic field that engages driving magnet 140 and urges piston assembly 114 to move along the axial direction A in order to compress refrigerant within chamber 112 as described above and will be understood by those skilled in the art. In particular, the magnetic field of driving coil 152 may engage driving magnet 140 in order to move inner back iron assembly 130 along the second axis A2 and piston head 116 along the first axis A1 during operation of driving coil 152. Thus, driving coil 152 may slide piston assembly 114 between the top dead center position and the bottom dead center position, e.g., by moving inner back iron assembly 130 along the second axis A2, during operation of driving coil 152.

Linear compressor 100 may include various components for permitting and/or regulating operation of linear compressor 100. In particular, linear compressor 100 includes a controller (not shown) that is configured for regulating operation of linear compressor 100. The controller is in, e.g., operative, communication with the motor, e.g., driving coil 152 of the motor. Thus, the controller may selectively activate driving coil 152, e.g., by supplying current to driving coil 152, in order to compress refrigerant with piston assembly 114 as described above.

The controller includes memory and one or more processing devices such as microprocessors, CPUs or the like, such as general or special purpose microprocessors operable to execute programming instructions or micro-control code associated with operation of linear compressor 100. The memory can represent random access memory such as DRAM, or read only memory such as ROM or FLASH. The processor executes programming instructions stored in the memory. The memory can be a separate component from the processor or can be included onboard within the processor. Alternatively, the controller may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Linear compressor 100 also includes a machined spring 120. Machined spring 120 is positioned in inner back iron assembly 130. In particular, inner back iron assembly 130 may extend about machined spring 120, e.g., along the circumferential direction C. Machined spring 120 also extends between first and second end portions 102 and 104 of casing 110, e.g., along the axial direction A. Machined spring 120 assists with coupling inner back iron assembly 130 to casing 110, e.g., cylinder assembly 111 of casing 110. In particular, inner back iron assembly 130 is fixed to machined spring 120 at a middle portion 119 of machined spring 120 as discussed in greater detail below.

During operation of driving coil 152, machined spring 120 supports inner back iron assembly 130. In particular, inner back iron assembly 130 is suspended by machined spring 120 within the stator of the motor such that motion of inner back iron assembly 130 along the radial direction R is hindered or limited while motion along the second axis A2 is relatively unimpeded. Thus, machined spring 120 may be substantially stiffer along the radial direction R than along the axial direction A. In such a manner, machined spring 120 can assist with maintaining a uniformity of the air gap AG between driving magnet 140 and driving coil 152, e.g., along the radial direction R, during operation of the motor and movement of inner back iron assembly 130 on the second axis A2. Machined spring 120 can also assist with hindering side pull forces of the motor from transmitting to piston assembly 114 and being reacted in cylinder assembly 111 as a friction loss.

Figure 6:
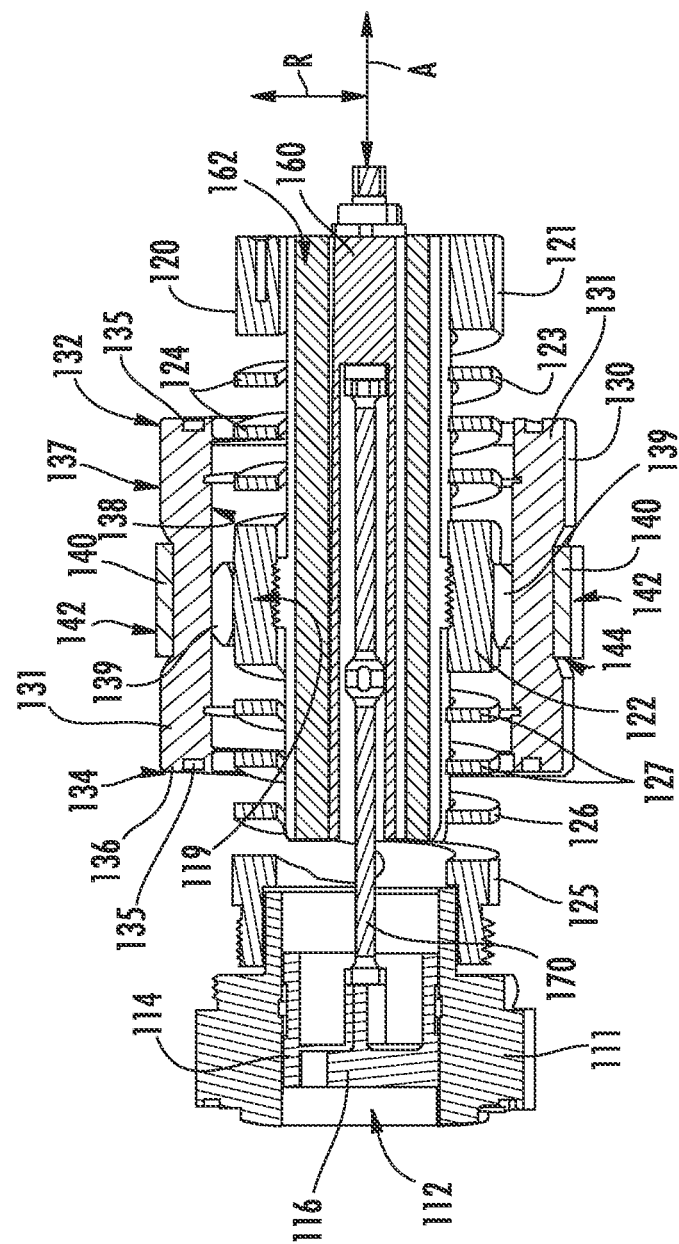
FIG. 6 provides a side section view of certain components of the exemplary linear compressor of FIG. 3.
Figure 10:
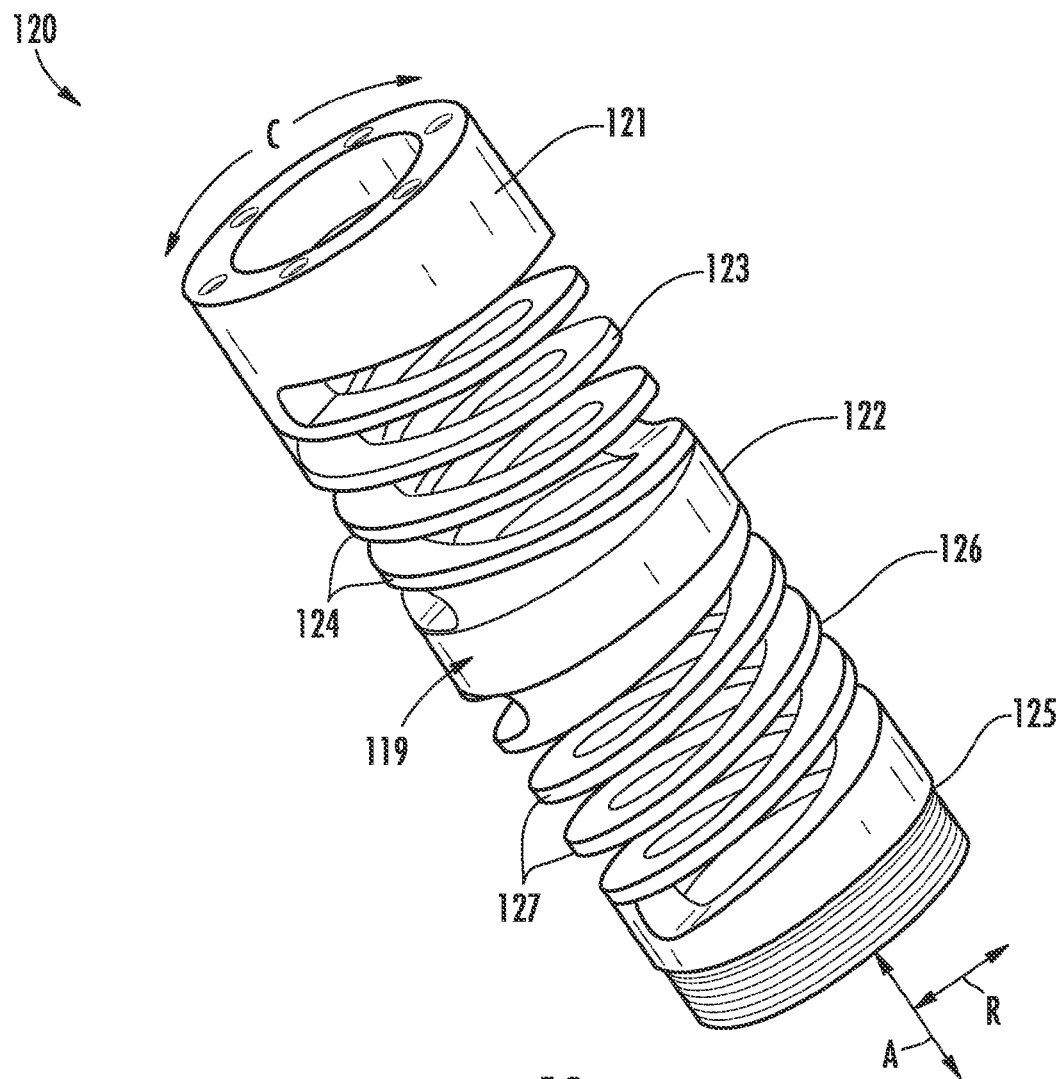
FIG. 10 provides a perspective view of a machined spring of the exemplary linear compressor of FIG. 3.

FIG. 6 provides a side section view of certain components of linear compressor 100. FIG. 10 provides a perspective view of machined spring 120. As may be seen in FIG. 10, machined spring 120 includes a first cylindrical portion 121, a second cylindrical portion 122, a first helical portion 123, a third cylindrical portion 125 and a second helical portion 126. First helical portion 123 of machined spring 120 extends between and couples first and second cylindrical portions 121 and 122 of machined spring 120, e.g., along the axial direction A. Similarly, second helical portion 126 of machined spring 120 extends between and couples second and third cylindrical portions 122 and 125 of machined spring 120, e.g., along the axial direction A.

Turning back to FIG. 4, first cylindrical portion 121 is mounted or fixed to casing 110 at first end portion 102 of casing 110. Thus, first cylindrical portion 121 is positioned at or adjacent first end portion 102 of casing 110. Third cylindrical portion 125 is mounted or fixed to casing 110 at second end portion 104 of casing 110, e.g., to cylinder assembly 111 of casing 110. Thus, third cylindrical portion 125 is positioned at or adjacent second end portion 104 of casing 110. Second cylindrical portion 122 is positioned at middle portion 119 of machined spring 120. In particular, second cylindrical portion 122 is positioned within and fixed to inner back iron assembly 130. Second cylindrical portion 122 may also be positioned equidistant from first and third cylindrical portions 121 and 125, e.g., along the axial direction A.

First cylindrical portion 121 of machined spring 120 is mounted to casing 110 with fasteners (not shown) that extend though end cap 115 of casing 110 into first cylindrical portion 121. In alternative exemplary embodiments, first cylindrical portion 121 of machined spring 120 may be threaded, welded, glued, fastened, or connected via any other suitable mechanism or method to casing 110. Third cylindrical portion 125 of machined spring 120 is mounted to cylinder assembly 111 at second end portion 104 of casing 110 via a screw thread of third cylindrical portion 125 threaded into cylinder assembly 111. In alternative exemplary embodiments, third cylindrical portion 125 of machined spring 120 may be welded, glued, fastened, or connected via any other suitable mechanism or method, such as an interference fit, to casing 110.

As may be seen in FIG. 10, first helical portion 123 extends, e.g., along the axial direction A, between first and second cylindrical portions 121 and 122 and couples first and second cylindrical portions 121 and 122 together. Similarly, second helical portion 126 extends, e.g., along the axial direction A, between second and third cylindrical portions 122 and 125 and couples second and third cylindrical portions 122 and 125 together. Thus, second cylindrical portion 122 is suspended between first and third cylindrical portions 121 and 125 with first and second helical portions 123 and 126.

First and second helical portions 123 and 126 and first, second and third cylindrical portions 121, 122 and 125 of machined spring 120 may be continuous with one another and/or integrally mounted to one another. As an example, machined spring 120 may be formed from a single, continuous piece of metal, such as steel, or other elastic material. In addition, first, second and third cylindrical portions 121, 122 and 125 and first and second helical portions 123 and 126 of machined spring 120 may be positioned coaxially relative to one another, e.g., on the second axis A2.

First helical portion 123 includes a first pair of helices 124. Thus, first helical portion 123 may be a double start helical spring. Helical coils of first helices 124 are separate from each other. Each helical coil of first helices 124 also extends between first and second cylindrical portions 121 and 122 of machined spring 120. Thus, first helices 124 couple first and second cylindrical portions 121 and 122 of machined spring 120 together. In particular, first helical portion 123 may be formed into a double-helix structure in which each helical coil of first helices 124 is wound in the same direction and connect first and second cylindrical portions 121 and 122 of machined spring 120.

Second helical portion 126 includes a second pair of helices 127. Thus, second helical portion 126 may be a double start helical spring. Helical coils of second helices 127 are separate from each other. Each helical coil of second helices 127 also extends between second and third cylindrical portions 122 and 125 of machined spring 120. Thus, second helices 127 couple second and third cylindrical portions 122 and 125 of machined spring 120 together. In particular, second helical portion 126 may be formed into a double-helix structure in which each helical coil of second helices 127 is wound in the same direction and connect second and third cylindrical portions 122 and 125 of machined spring 120.

By providing first and second helices 124 and 127 rather than a single helix, a force applied by machined spring 120 may be more even and/or inner back iron assembly 130 may rotate less during motion of inner back iron assembly 130 along the second axis A2. In addition, first and second helices 124 and 127 may be counter or oppositely wound. Such opposite winding may assist with further balancing the force applied by machined spring 120 and/or inner back iron assembly 130 may rotate less during motion of inner back iron assembly 130 along the second axis A2. In alternative exemplary embodiments, first and second helices 124 and 127 may include more than two helices. For example, first and second helices 124 and 127 may each include three helices, four helices, five helices or more.

By providing machined spring 120 rather than a coiled wire spring, performance of linear compressor 100 can be improved. For example, machined spring 120 may be more reliable than comparable coiled wire springs. In addition, the stiffness of machined spring 120 along the radial direction R may be greater than that of comparable coiled wire springs. Further, comparable coiled wire springs include an inherent unbalanced moment. Machined spring 120 may be formed to eliminate or substantially reduce any inherent unbalanced moments. As another example, adjacent coils of a comparable coiled wire spring contact each other at an end of the coiled wire spring, and such contact may dampen motion of the coiled wire spring thereby negatively affecting a performance of an associated linear compressor. In contrast, by being formed of a single continuous material and having no contact between adjacent coils, machined spring 120 may have less dampening than comparable coiled wire springs.

As may be seen in FIG. 6, inner back iron assembly 130 includes an outer cylinder 136 and a sleeve 139. Outer cylinder 136 defines outer surface 137 of inner back iron assembly 130 and also has an inner surface 138 positioned opposite outer surface 137 of outer cylinder 136. Sleeve 139 is positioned on or at inner surface 138 of outer cylinder 136. A first interference fit between outer cylinder 136 and sleeve 139 may couple or secure outer cylinder 136 and sleeve 139 together. In alternative exemplary embodiments, sleeve 139 may be welded, glued, fastened, or connected via any other suitable mechanism or method to outer cylinder 136.

Sleeve 139 extends about machined spring 120, e.g., along the circumferential direction C. In addition, middle portion 119 of machined spring 120 (e.g., third cylindrical portion 125) is mounted or fixed to inner back iron assembly 130 with sleeve 139. As may be seen in FIG. 6, sleeve 139 extends between inner surface 138 of outer cylinder 136 and middle portion 119 of machined spring 120, e.g., along the radial direction R. In particular, sleeve 139 extends between inner surface 138 of outer cylinder 136 and second cylindrical portion 122 of machined spring 120, e.g., along the radial direction R. A second interference fit between sleeve 139 and middle portion 119 of machined spring 120 may couple or secure sleeve 139 and middle portion 119 of machined spring 120 together. In alternative exemplary embodiments, sleeve 139 may be welded, glued, fastened, or connected via any other suitable mechanism or method to middle portion 119 of machined spring 120 (e.g., second cylindrical portion 122 of machined spring 120).

Outer cylinder 136 may be constructed of or with any suitable material. For example, outer cylinder 136 may be constructed of or with a plurality of (e.g., ferromagnetic) laminations 131. Laminations 131 are distributed along the circumferential direction C in order to form outer cylinder 136. Laminations 131 are mounted to one another or secured together, e.g., with rings 135 at first and second end portions 132 and 134 of inner back iron assembly 130. Outer cylinder 136, e.g., laminations 131, define a recess 144 that extends inwardly from outer surface 137 of outer cylinder 136, e.g., along the radial direction R. Driving magnet 140 is positioned in recess 144, e.g., such that driving magnet 140 is inset within outer cylinder 136.

A piston flex mount 160 is mounted to and extends through inner back iron assembly 130. In particular, piston flex mount 160 is mounted to inner back iron assembly 130 via sleeve 139 and machined spring 120. Thus, piston flex mount 160 may be coupled (e.g., threaded) to machined spring 120 at second cylindrical portion 122 of machined spring 120 in order to mount or fix piston flex mount 160 to inner back iron assembly 130. A coupling 170 extends between piston flex mount 160 and piston assembly 114, e.g., along the axial direction A. Thus, coupling 170 connects inner back iron assembly 130 and piston assembly 114 such that motion of inner back iron assembly 130, e.g., along the axial direction A or the second axis A2, is transferred to piston assembly 114.

Figure 8:
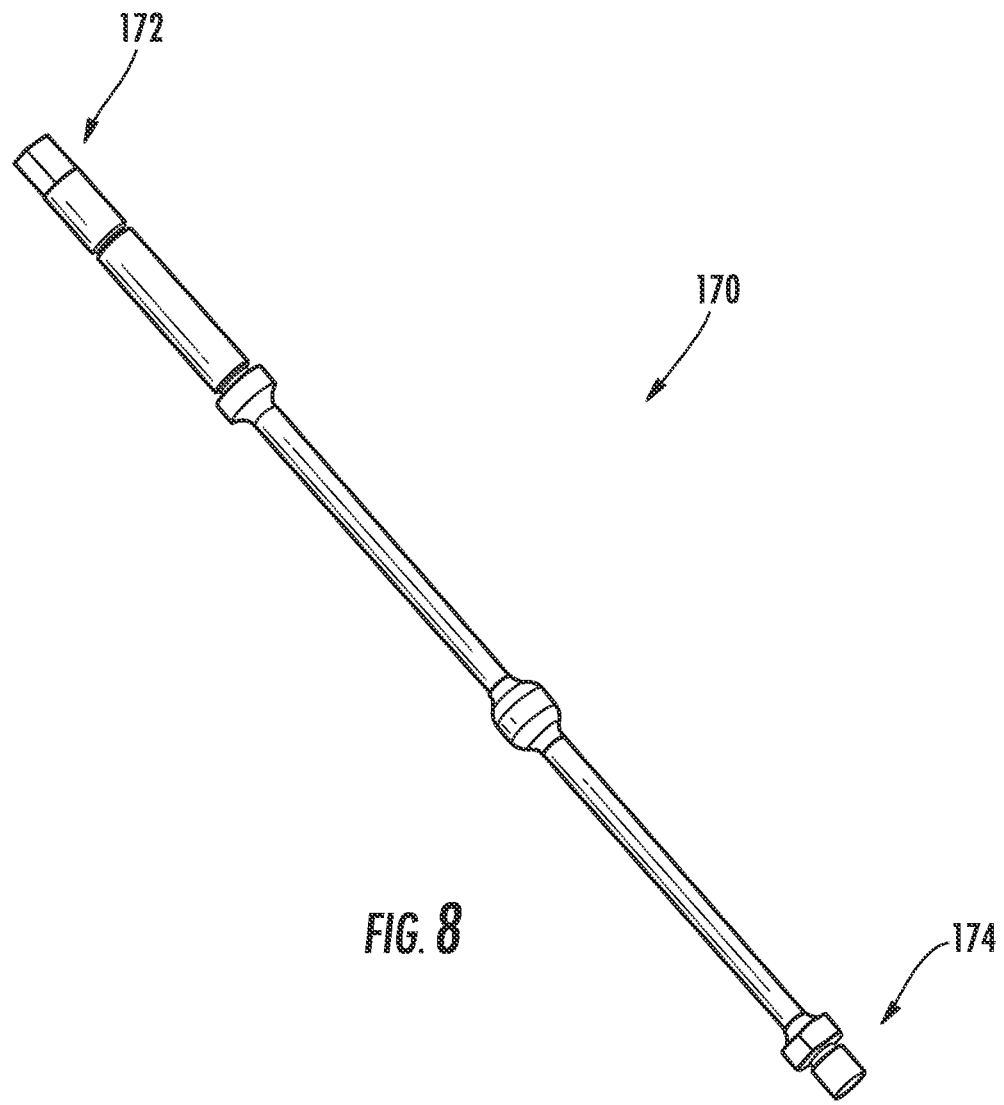
FIG. 8 provides a perspective view of a coupling of the exemplary linear compressor of FIG. 3.

FIG. 8 provides a perspective view of coupling 170. As may be seen in FIG. 8, coupling 170 extends between a first end portion 172 and a second end portion 174, e.g., along the axial direction A. Turning back to FIG. 6, first end portion 172 of coupling 170 is mounted to the piston flex mount 160, and second end portion 174 of coupling 170 is mounted to piston assembly 114. First and second end portions 172 and 174 of coupling 170 may be positioned at opposite sides of driving coil 152. In particular, coupling 170 may extend through driving coil 152, e.g., along the axial direction A.

Figure 7:
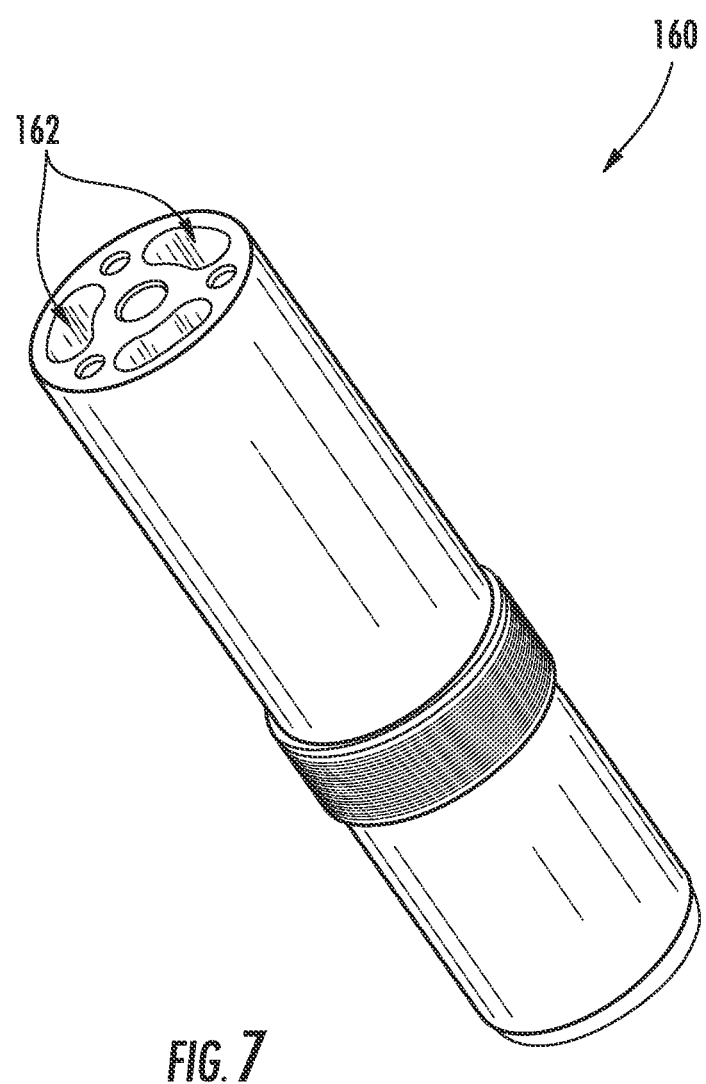
FIG. 7 provides a perspective view of a piston flex mount of the exemplary linear compressor of FIG. 3.
Figure 9:
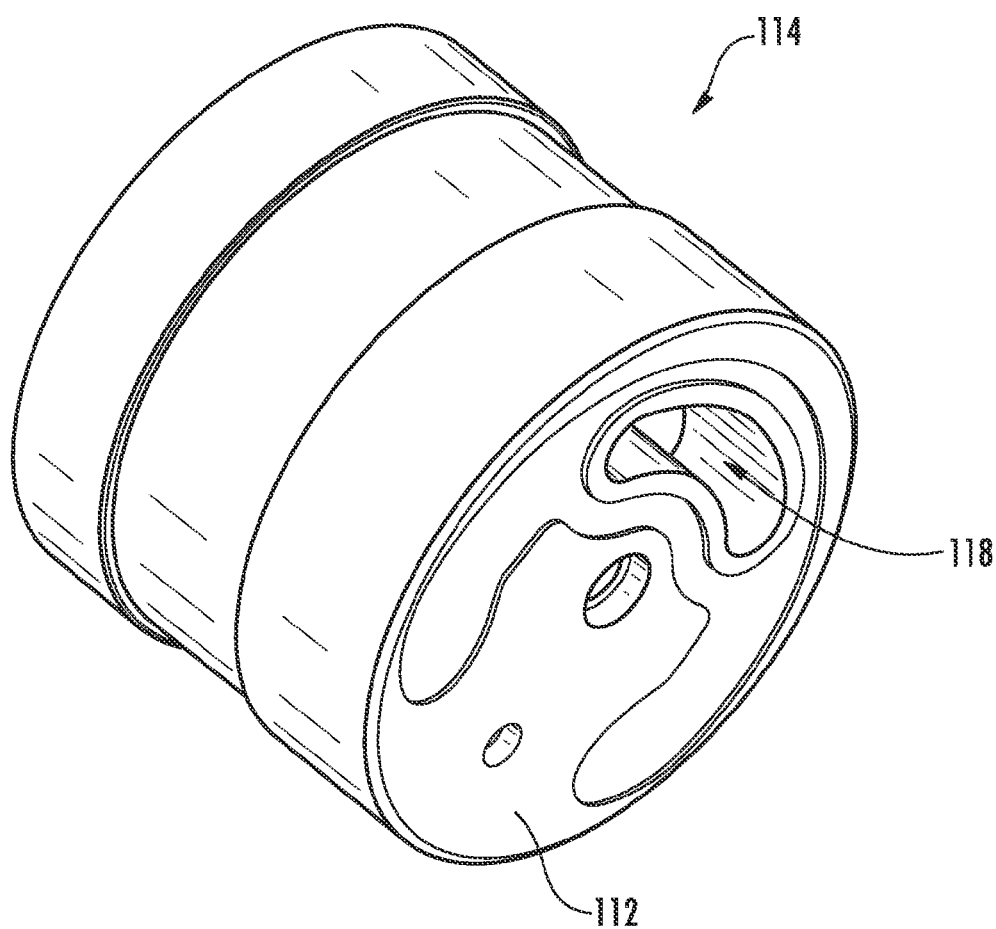
FIG. 9 provides a perspective view of a piston of the exemplary linear compressor of FIG. 3.

FIG. 7 provides a perspective view of piston flex mount 160. FIG. 9 provides a perspective view of piston assembly 114. As may be seen in FIG. 7, piston flex mount 160 defines at least one passage 162. Passage 162 of piston flex mount 160 extends, e.g., along the axial direction A, through piston flex mount 160. Thus, a flow of fluid, such as air or refrigerant, may pass though piston flex mount 160 via passage 162 of piston flex mount 160 during operation of linear compressor 100.

As may be seen in FIG. 9, piston head 116 also defines at least one opening 118. Opening 110 of piston head 116 extends, e.g., along the axial direction A, through piston head 116. Thus, the flow of fluid may pass though piston head 116 via opening 118 of piston head 116 into chamber 112 during operation of linear compressor 100. In such a manner, the flow of fluid (that is compressed by piston head 114 within chamber 112) may flow through piston flex mount 160 and inner back iron assembly 130 to piston assembly 114 during operation of linear compressor 100.

Figures 11, 12:
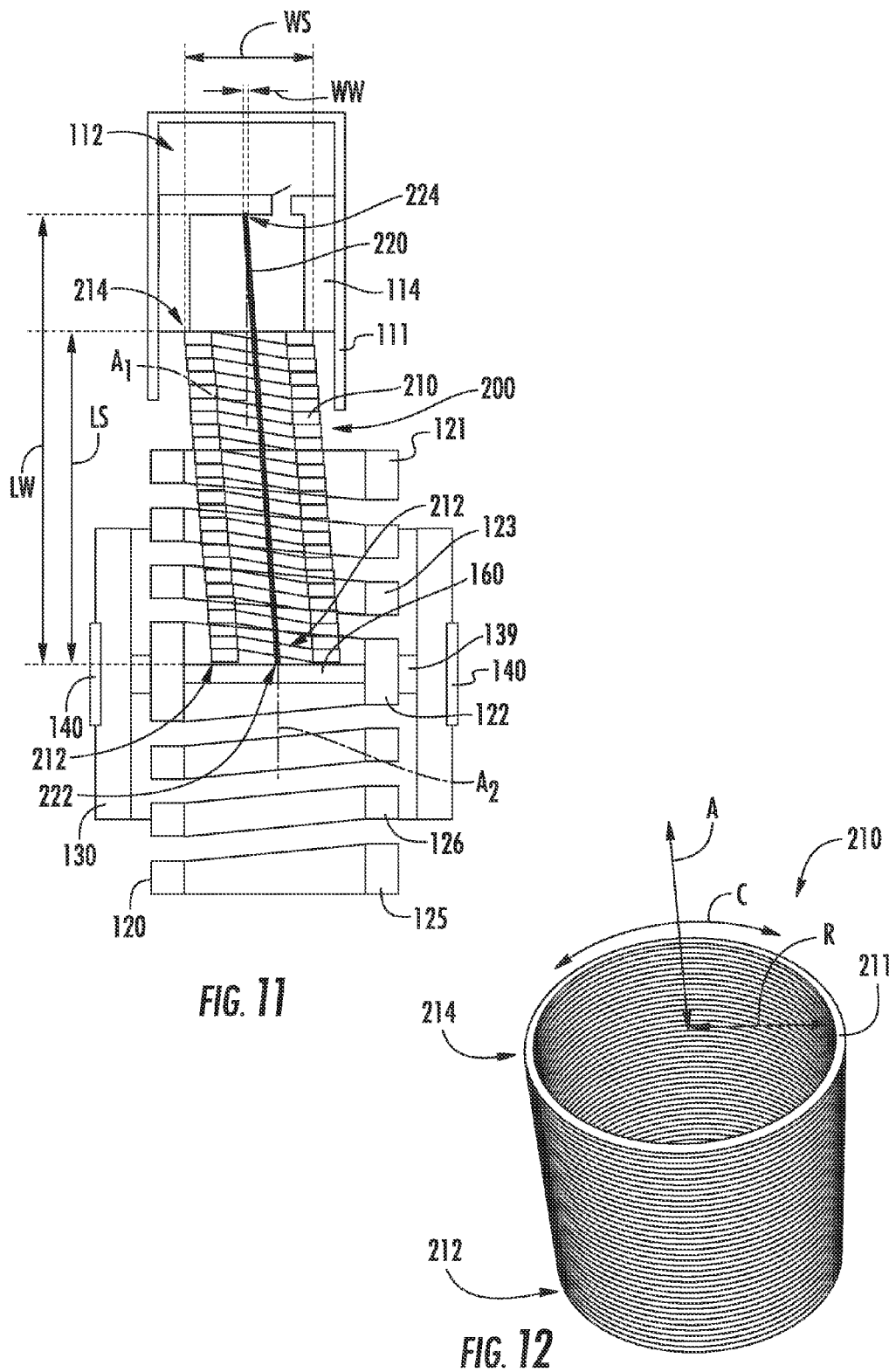
FIG. 11 provides a schematic view of a compliant coupling according to an exemplary embodiment of the present subject matter with certain components of the exemplary linear compressor of FIG. 3.
FIGS. 12 and 13 provide perspective views of a flat wire coil spring of the exemplary compliant coupling of FIG. 11.

FIG. 11 provides a schematic view of a flexible or compliant coupling 200 according to an exemplary embodiment of the present subject matter with certain components of linear compressor 100. Compliant coupling 200 may be used in any suitable linear compressor to connect or couple a moving component (e.g., driven by a motor of the linear compressor) to a piston of the linear compressor. As an example, compliant coupling 200 may be used in linear compressor 100 (FIG. 3), e.g., as coupling 170. Thus, while described in the context of linear compressor 100, it should be understood that compliant coupling 200 may be used in any suitable linear compressor. In particular, compliant coupling 200 may be used in linear compressors with moving inner back irons or in linear compressors with stationary or fixed inner back irons.

As may be seen in FIG. 11, flexible coupling 200 includes a flat wire coil spring 210. Flat wire coil spring 210 may extend, e.g., along the axial direction A, between a mover of a linear compressor and a piston of the linear compressor. For example, flat wire coil spring 210 may extend between inner back iron assembly 130 and piston assembly 114, e.g., along the axial direction A. In particular, flat wire coil spring 210 extends between a first end portion 212 and a second end portion 214, e.g., along the axial direction A. First end portion 212 of flat wire coil spring 210 is mounted or fixed to inner back iron assembly 130, e.g., via piston flex mount 160. Second end portion 214 of flat wire coil spring 210 is mounted or fixed to piston assembly 114.

Compliant coupling 200 also includes a wire 220. Wire 220 is disposed within flat wire coil spring 210. Wire 220 may extend, e.g., along the axial direction A, between a mover of a linear compressor and a piston of the linear compressor within flat wire coil spring 210. As an example, wire 220 may extend between inner back iron assembly 130 and piston assembly 114, e.g., along the axial direction A, within flat wire coil spring 210. In particular, wire 220 extends between a first end portion 222 and a second end portion 224, e.g., along the axial direction A. First end portion 222 of wire 220 is mounted or fixed to inner back iron assembly 130, e.g., via piston flex mount 160. Second end portion 224 of wire 220 is mounted or fixed to piston assembly 114. As shown in FIG. 11, wire 220 may be positioned concentrically within flat wire coil spring 210, e.g., in a plane that is perpendicular to the axial direction A.

Flat wire coil spring 210 has a width WS, e.g., in a plane that is perpendicular to the axial direction A. Wire 220 also has a width WW, e.g., in a plane that is perpendicular to the axial direction A. The width WS of flat wire coil spring 210 and the width WW of wire 220 may be any suitable widths. For example, the width WS of flat wire coil spring 210 may be greater than the width WW of wire 220. In particular, the width WS of flat wire coil spring 210 may be at least five times, at least ten times, or at least twenty times greater than the width WW of wire 220.

Flat wire coil spring 210 also has a length LS, e.g., along the axial direction A, and wire 220 has a length LW, e.g., along the axial direction A. The length LS of flat wire coil spring 210 and the length LW of wire 220 may be any suitable lengths. For example, the length LS of flat wire coil spring 210 may be about equal to the length LW of wire 220. As another example, the length LS of flat wire coil spring 210 may be greater than length LW of wire 220.

Figure 13:
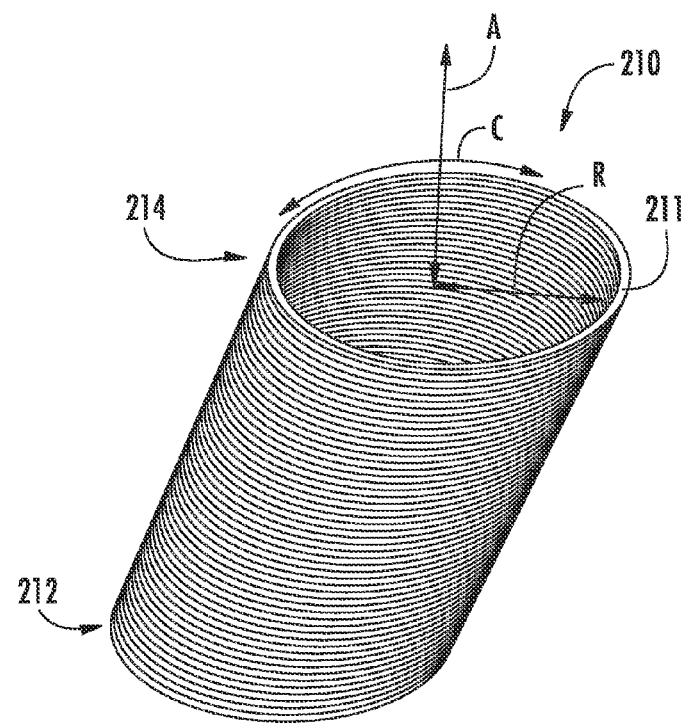

FIGS. 12 and 13 provide perspective views of flat wire coil spring 210 of compliant coupling 200. As may be seen in FIGS. 12 and 13, flat wire coil spring 210 includes a flat wire 211. Flat wire 211 may be constructed of or with any suitable material. For example, flat wire 211 may be constructed of or with a metal, such as steel.

Figure 14:
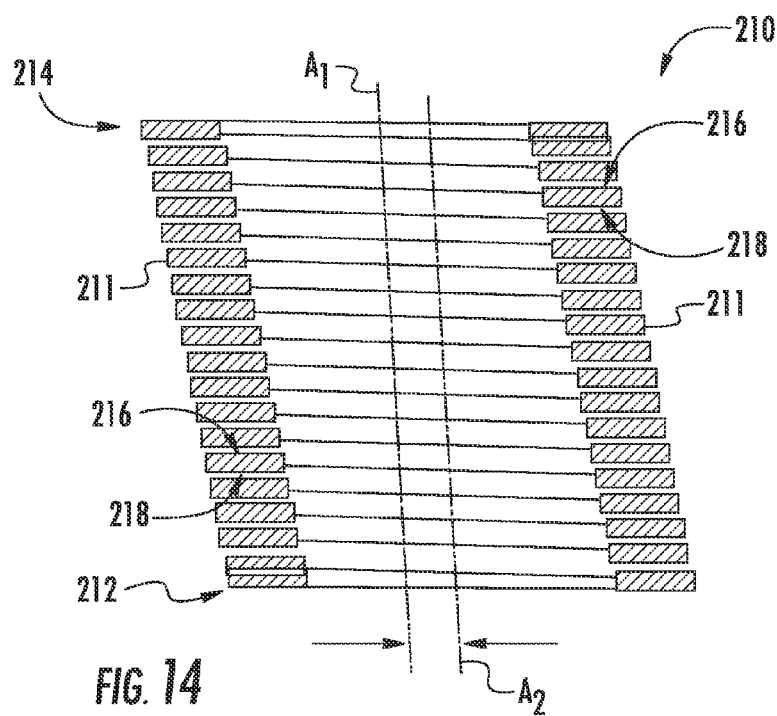
FIG. 14 provides a section view of the flat wire coil spring of FIG. 13.

Flat wire 211 is wound or coiled into a helical shape to form flat wire coil spring 210. In particular, flat wire 211 has a first flat or planar surface 216 (FIG. 14) and a second flat or planar surface 218 (FIG. 14). First and second planar surfaces 216 and 218 are positioned opposite each other on flat wire 211, e.g., along the axial direction A. With flat wire 211 wound or coiled into a helical shape, first planar surface 216 of flat wire 211 is positioned on and contacts second planar surface 218 of flat wire 211 between adjacent coils of flat wire coil spring 210. Thus, first planar surface 216 of flat wire 211 in a first coil of flat wire coil spring 210 is positioned on and contacts second planar surface 218 of flat wire 211 in a second coil of flat wire coil spring 210. The first and second coils of flat wire coil spring 210 being positioned adjacent each other. Thus, in certain exemplary embodiments, flat wire coil spring 210 may be naturally fully compressed as shown in FIG. 12.

FIG. 14 provides a section view of flat wire coil spring 210. As may be seen in FIG. 14, first and second axes A1 and A2 may be offset from each other, e.g., along the radial direction R. Thus, first and second axes A1 and A2 may not be coaxial, and motion of inner back iron assembly 130 may be offset from piston assembly 114, e.g., along the radial direction R. In addition, first and second end portions 212 and 214 of flat wire coil spring 210 may be offset from each other, e.g., along the radial direction R, and first and second end portions 222 and 224 of wire 220 may be offset from each other, e.g., along the radial direction R. The offset between first and second axes A1 and A2, e.g., along the radial direction R, may be any suitable offset. For example, first and second axes A1 and A2 may be offset from each other, e.g., along the radial direction R, by less than about one hundredth of an inch.

Flat wire coil spring 210 can support large compressive loads, e.g., in the natural state shown in FIG. 12 and/or in the radially deflected configuration of FIG. 13. Thus, flat wire coil spring 210 can support large compressive loads despite first and second end portions 212 and 214 of flat wire coil spring 210 being offset from each other, e.g., along the radial direction R. In addition, flat wire coil spring 210 can permit first and second end portions 212 and 214 of flat wire coil spring 210 to translate, e.g., along the radial direction R, with respect to each other with little force required.

As discussed above, compliant coupling 200 may extend between inner back iron assembly 130 and piston assembly 114, e.g., along the axial direction A, and connect inner back iron assembly 130 and piston assembly 114 together. In particular, compliant coupling 200 transfers motion of inner back iron assembly 130 along the axial direction A to piston assembly 114. However, compliant coupling 200 is compliant or flexible along the radial direction R due to flat wire coil spring 210 and wire 220. In particular, flat wire coil spring 210 and wire 220 of compliant coupling 200 may be sufficiently compliant along the radial direction R such little or no motion of inner back iron assembly 130 along the radial direction R is transferred to piston assembly 114 by compliant coupling 200. For example, flat wire coil spring 210 may assist with transferring compressive loads between inner back iron assembly 130 and piston assembly 114 along the axial direction A while wire 220 may assist with transferring tensile loads between inner back iron assembly 130 and piston assembly 114 along the axial direction A despite first and second axes A1 and A2 being offset from each other, e.g., along the radial direction R. In such a manner, side pull forces of the motor are decoupled from piston assembly 114 and/or cylinder assembly 111 and friction between position assembly 114 and cylinder assembly 111 may be reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A linear compressor defining a radial direction, a circumferential direction and an axial direction, the linear compressor comprising:
   a cylinder assembly defining a chamber;
   a piston received within the chamber of the cylinder assembly such that the piston is slidable along a first axis within the chamber of the cylinder assembly;
   an inner back iron assembly;
   a driving coil extending about the inner iron assembly along the circumferential direction, the driving coil operable to move the inner back iron assembly along a second axis, the first and second axes being substantially parallel to the axial direction;
   a magnet mounted to the inner back iron assembly such that the magnet is spaced apart from the driving coil by an air gap along the radial direction;
   a spring extending along the axial direction, wherein the inner back iron assembly extends along the circumferential direction about the spring in attachment thereto; and
   a flexible coupling comprising
      a flat wire coil spring extending from the inner back iron assembly to the piston along the axial direction radially inward from the spring, the flat wire coil spring comprising a flat wire wound into a helical shape, the flat wire having a first planar surface and a second planar surface positioned opposite each other on the flat wire, the first planar surface of the flat wire positioned on and contacting the second planar surface of the flat wire between adjacent coils of the flat wire coil spring; and
      a wire disposed within the flat wire coil spring and extending from the inner back iron assembly to the piston along the axial direction.

2. The linear compressor of claim 1, wherein a magnetic field of the driving coil engages the magnet in order to move the inner back iron assembly in the driving coil and the piston within the chamber of the cylinder assembly during operation of the driving coil.

3. The linear compressor of claim 1, wherein the wire is positioned concentrically within the flat wire coil spring in a plane that is perpendicular to the axial direction.

4. The linear compressor of claim 1, wherein the flat wire coil spring has a width in a plane that is perpendicular to the axial direction, the wire also having a width in the plane that is perpendicular to the axial direction, the width of the flat wire coil spring being greater than the width of the wire.

5. The linear compressor of claim 1, wherein the flat wire coil spring has a length along the axial direction, the wire also having a length along the axial direction, the length of the flat wire coil spring being about equal to the length of the wire.

6. The linear compressor of claim 1, wherein:
the wire extends between a first end portion and a second end portion along the axial direction, the first end portion of the wire mounted to the inner back iron assembly, the second end portion of the wire mounted to the piston; and
the flat wire coil spring extends between a first end portion and a second end portion along the axial direction, the first end portion of the flat wire coil spring mounted to the inner back iron assembly, the second end portion of the flat wire coil spring mounted to the piston.

7. The linear compressor of claim 6, wherein the first end portion of the wire and the first end portion of the flat wire coil spring are positioned concentrically on the second axis, wherein the second end portion of the wire and the second end portion of the flat wire coil spring are positioned concentrically on the first axis.

8. The linear compressor of claim 7, wherein the first and second axes are offset from each other along the radial direction.

9. A linear compressor, comprising:
a cylinder assembly defining a chamber;
a piston slidably received within the chamber of the cylinder assembly;
a driving coil;
a mover positioned in the driving coil;
a magnet mounted to the mover, a magnetic field of the driving coil engaging the magnet in order to move the mover in the driving coil during operation of the driving coil;
a spring extending along the axial direction, wherein the mover extends along the circumferential direction about the spring in attachment thereto; and
a flexible coupling comprising
a flat wire coil spring extending from the mover to the piston radially inward from the spring, the flat wire coil spring comprising a flat wire wound into a helical shape, the flat wire having a first planar surface and a second planar surface positioned opposite each other on the flat wire, the first planar surface of the flat wire positioned on and contacting the second planar surface of the flat wire between adjacent coils of the flat wire coil spring; and
a wire disposed within the flat wire coil spring and extending from the mover to the piston.

10. The linear compressor of claim 9, wherein the wire is positioned concentrically within the flat wire coil spring.

11. The linear compressor of claim 9, wherein:
the wire extends between a first end portion and a second end portion, the first end portion of the wire mounted to the mover, the second end portion of the wire mounted to the piston; and
the flat wire coil spring extends between a first end portion and a second end portion, the first end portion of the flat wire coil spring mounted to the mover, the second end portion of the flat wire coil spring mounted to the piston.

12. The linear compressor of claim 11, wherein the first end portion of the wire and the first end portion of the flat wire coil spring are positioned concentrically, wherein the second end portion of the wire and the second end portion of the flat wire coil spring are positioned concentrically.

13. The linear compressor of claim 12, wherein the first and second end portions of the wire are radially offset from each other.

14. A linear compressor defining a radial direction, a circumferential direction and an axial direction, the linear compressor comprising:
a cylinder assembly defining a chamber;
a piston received within the chamber of the cylinder assembly such that the piston is slidable along a first axis within the chamber of the cylinder assembly;
an inner back iron assembly;
a driving coil extending about the inner iron assembly along the circumferential direction, the driving coil operable to move the inner back iron assembly along a second axis, the first and second axes being substantially parallel to the axial direction and offset from each other along the radial direction;
a magnet mounted to the inner back iron assembly such that the magnet is spaced apart from the driving coil by an air gap along the radial direction;
a spring extending along the axial direction, wherein the inner back iron assembly extends along the circumferential direction about the spring in attachment thereto; and
a flexible coupling comprising
a flat wire coil spring extending from the mover to the piston radially inward from the spring, the flat wire coil spring comprising a flat wire wound into a helical shape, the flat wire having a first planar surface and a second planar surface positioned opposite each other on the flat wire, the first planar surface of the flat wire positioned on and contacting the second planar surface of the flat wire between adjacent coils of the flat wire coil spring; and
a wire disposed within the flat wire coil spring and extending between the mover and the piston, the wire extending between a first end portion and a second end portion along the axial direction, the first end portion of the wire mounted to the inner back iron assembly, the second end portion of the wire mounted to the piston,
wherein the flat wire coil spring extends between a first end portion and a second end portion along the axial direction, the first end portion of the flat wire coil spring mounted to the inner back iron assembly, the second end portion of the flat wire coil spring mounted to the piston.

* * * * *